United States Patent [19]

Cheng

[11] Patent Number: 5,093,847
[45] Date of Patent: Mar. 3, 1992

[54] ADAPTIVE PHASE LOCK LOOP

[75] Inventor: King Y. Cheng, Penn Valley, Calif.
[73] Assignee: Silicon Systems, Inc., Tustin, Calif.
[21] Appl. No.: 633,477
[22] Filed: Dec. 21, 1990
[51] Int. Cl.$^5$ ............................................ H04L 27/06
[52] U.S. Cl. .................................... 375/97; 375/118; 328/155
[58] Field of Search .................... 375/11, 97, 118, 119, 375/120; 455/258, 260, 265; 328/155

[56] References Cited

U.S. PATENT DOCUMENTS

| | | | |
|---|---|---|---|
| 4,514,855 | 4/1985 | Lang et al. | 375/97 |
| 4,777,640 | 10/1988 | Turner et al. | 375/118 |
| 4,953,182 | 8/1990 | Chung | 455/260 |
| 4,958,360 | 9/1990 | Sari | 375/97 |

*Primary Examiner*—Stephen Chin
*Attorney, Agent, or Firm*—Hecker & Harriman

[57] ABSTRACT

An adaptive phase lock loop for jitter tracking. A filter in the adaptive PLL has coefficients that are automatically adjusted to minimize the error signal. The first block of the adaptive PLL is a phase shifter that is used to eliminate the frequency offset and phase offset in the input signal. The output of the phase shifter is received by a slicer that makes an estimate of what the corrected signal should be. Then the difference between the input and output of the slicer is multiplied by the output of the slicer. The imaginary part of the result is used as an estimate of the phase error. After passing through an amplitude limiter the signal is provided to a finite impulse response (FIR) filter having adaptive coefficients. The FIR coefficients are adjusted to minimize the mean squared phase error using a gradient method. These coefficients are updated each baud. A second order loop is added to track any frequency offset present in the line signal. The signal is fed through a sin/cos table back to the phase shifter.

17 Claims, 3 Drawing Sheets

ADAPTIVE PHASE LOCK LOOP

FIELD OF THE INVENTION

This invention relates to the field of phase lock loops to track phase jitter and frequency offset of line signals.

BACKGROUND ART

A number of transmission schemes are utilized to maximize the amount of information that can be transmitted in a given bandwidth. Two popular modulation schemes are known as quadrature phase shift key (QPSK) and quadrature amplitude modulation (QAM) (in which the phase and amplitude of a modulated sine wave carrier signal are utilized to convey information). An example of a QPSK transmission scheme is illustrated in FIG. 1. QPSK signals are generated by shifting the phase of a carrier wave by $\pi/2$ radians. A QPSK signal has one of four possible phases, each phase representing one of four binary pairs (00, 01, 10, 11). The QPSK wave is defined by $$S_{i(t)} = \cos(\omega_{ct} + \theta_i).$$

Transmission of this type is often called quadrature transmission, with two carriers in phase quadrature to one another (cosine $\omega_{ct}$ and sine $\omega_{ct}$) transmitted simultaneously over the same channel.

Referring to FIG. 1, the horizontal axis, corresponding to $a_i$, is called the "in phase" axis. The vertical axis, corresponding to $b_i$, is called the "quadrature" axis. The signal points in the four quadrants of FIG. 2 represent a signal "constellation."

By assigning multiple values to $a_i$ and $b_i$, the multi-level symbol signalling scheme known as quadrature amplitude modulation (QAM), is generated. The QAM scheme involves multi-level amplitude modulation applied independently to each of the quadrature carriers. Thus, a 16 state constellation, such as that illustrated in FIG. 2, may be generated. Each point of the QPSK modulation scheme of FIG. 1 now represents four points in the QAM scheme, so that a total of 16 points are defined in the QAM constellation. The general QAM signal is given by:

$$S_i(t) = r_i \cosine(\omega_{ct} + \theta_i)$$

The amplitude $r_i$ is given by the appropriate combinations of ($a_i$, $b_i$). A phase detector/amplitude level detector combination is then used to extract digital information.

In both QPSK and QAM schemes, it is necessary to extract phase information so that the demodulation of the signal may be achieved. In other words, both the frequency and the phase of the incoming signal must be matched by a demodulator to accurately decode the information signal.

Errors can be introduced to a transmitted complex signal that can affect the amplitude and phase of the signal, leading to transmission errors. Amplitude errors can be minimized by use of an automatic gain control (AGC) circuit. A phase error, also known as "jitter" is a rotation of a transmitted symbol that does not change the magnitude of the symbol. This can cause a receive signal to differ from a transmitted signal, resulting in recovery errors.

FIG. 3 illustrates a jitter error that may be introduced to a complex input signal. In FIG. 3, the horizontal axis represents changes in the real portion of the complex term and the vertical axis represents changes in the imaginary portion of the complex signal. In FIG. 3, constellation points A and D are illustrated in first and second quadrants, respectively. These constellation points A and D represent the terminal of a vector whose origin is coincident with the origin of the coordinate system. A phase shift error results in the vector shifting by an angle $\theta$ in the direction of the phase shift so that the actual constellation points are moved from points A and D to points A' and D', respectively. The amplitude at both A and A' is equal. However, the angle with respect to the horizontal axis has changed by an amount $\theta$. This phase offset error, or jitter error, is often corrected in the prior art through use of a phase locked loop.

One prior art attempt to eliminate jitter from phase encoded signals is described in U.S. Pat. No. 4,953,186 issued Aug. 28, 1990 and assigned to Silicon Systems Inc., the assignee of the present application. This prior art scheme uses a decision-directed error signal as an input to a feedback loop. The error signal is filtered and coupled to a phase locked loop centered at the center of the jitter tracking frequency range, e.g., 55 Hz. Because the jitter tracker is restricted to a constrained frequency range, tracking capability is limited.

A prior art attempt to provide dynamic capture range adjustment for a jitter tracker is described in U.S. Pat. No. 4,689,804. In the '804 patent, the capture range of a phase locked loop is dynamically altered during a training sequence to allow for capturing a wide range of jitter frequencies. During the training sequence, the damping factor of the loop is gradually altered to substantially reduce the capture range and response time of the loop once jitter acquisition has occurred. This results in enhanced noise performance.

When a training sequence is initiated, a capture range of approximately 300 Hz is defined. During the course of the training sequence, the capture range is gradually reduced to approximately 20 Hz, so that the noise bandwidth is very narrow. If the jitter increases beyond the 20 Hz range, a large number of errors will occur and a training sequence will again be initiated to widen the capture range.

SUMMARY OF THE PRESENT INVENTION

The phase jitter tracker of the present invention employs a more efficient phase lock loop that is able to track phase jitter and frequency offset of line signal for high speed data transmitting devices. A filter in the adaptive PLL has coefficients that are automatically adjusted to minimize the error signal.

The first block of the adaptive PLL is a phase shifter that is used to eliminate the frequency offset and phase offset in the input signal. The output of the phase shifter is received by a slicer that makes an estimate of what the corrected signal should be. Then the difference between the input and output of the slicer is multiplied by the output of the slicer. The imaginary part of the result is used as an estimate of the phase error. After passing through an amplitude limiter, the signal is provided to a finite impulse response (FIR) filter having adaptive coefficients. The FIR coefficients are adjusted to minimize the mean squared phase error using a gradient method. These coefficients are updated each baud. A second order loop is added to track any frequency offset present in the line signal. The signal is fed through a sin/cos table back to the phase shifter.

DETAILED DESCRIPTION OF THE PRESENT INVENTION

An improved phase lock loop for removing jitter from an incoming data signal is described. In the following description, numerous specific details, such as frequency range, number of coefficients, etc. are described in detail in order to provide a more thorough description of the present invention. It will be apparent, however, to one skilled in the art, that the present invention may be practiced without these specific details. In other instances, well-known features have not been described in detail in order not to unnecessarily obscure the present invention.

In the present invention, an adaptive PLL is able to configure itself to track the specific characteristics of the phase jitter of the line signal. As a result, the residual phase error is reduced to a greater extent compared to a conventional PLL. The present invention is utilized to eliminate or reduce the effects of phase jitter in transmission systems using QPSK or QAM signal transmission schemes.

The present invention receives a transmitted signal and converts the signal into a complex value having real and imaginary components. The receive signal is compared to an ideal value to generate a difference signal. This difference signal is then correlated with the conjugate of the slicer output. The imaginary component of this operation approximates the phase error.

The estimated phase error is provided to an FIR filter. The FIR filter includes a plurality of coefficients, and the coefficients are adjusted to minimize the mean squared phase error by a gradient method. The output of the FIR filter is provided to a sine/cosine table. The output of the sine/cosine table is an error correction value coupled in a feedback loop to the input signal to provide phase error correction.

Figure 1:
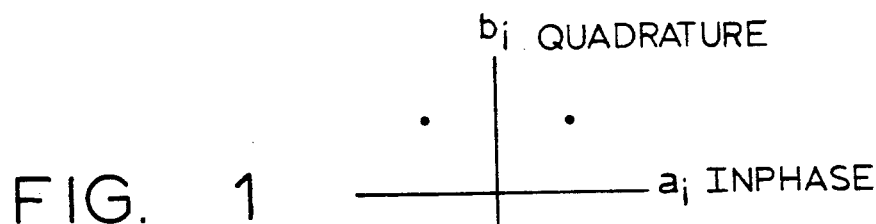
FIG. 1 illustrates a four point QPSK constellation.
Figure 2:
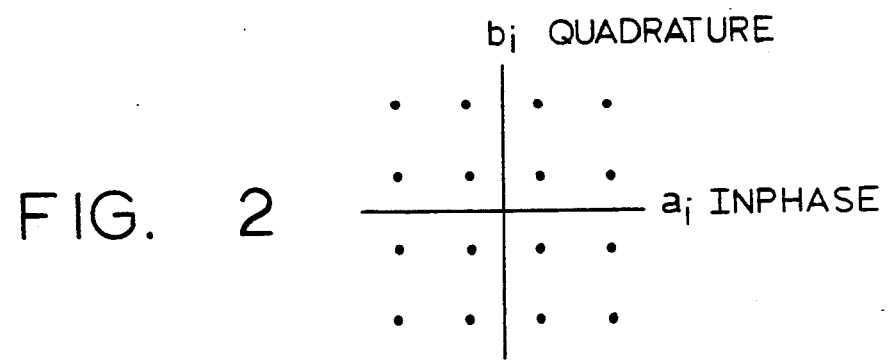
FIG. 2 illustrates a 16 point QAM constellation.
Figure 3:
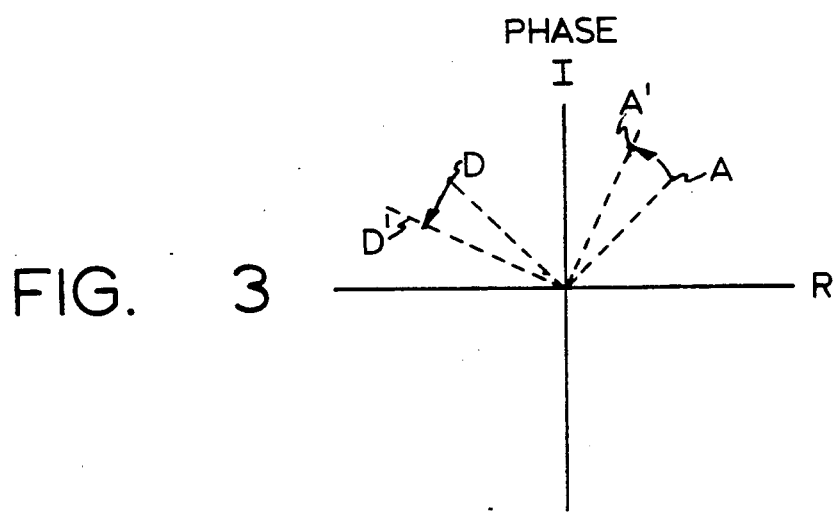
FIG. 3 illustrates the effect of jitter on a constellation point.
Figure 4:
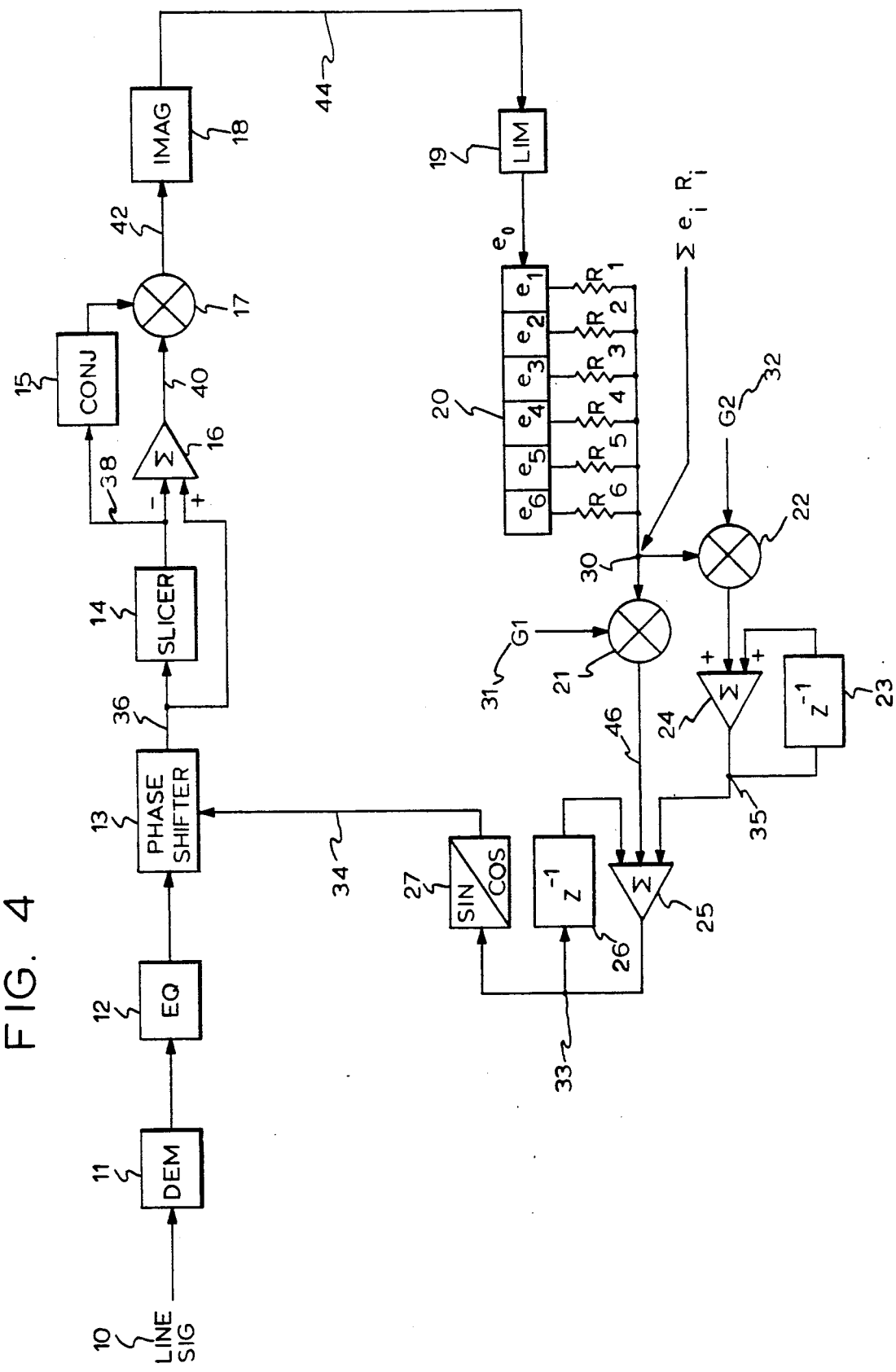
FIG. 4 is a block diagram illustrating the preferred embodiment of the adaptive phase locked loop of the present invention.

In the preferred embodiment, the present invention is used in the receive channel of a modem. The preferred embodiment of the present invention is illustrated in FIG. 4. FIG. 4 is a block diagram of the adaptive phase lock loop. In the example herein, the input signal is a quadrature amplitude modulation (QAM) signal. However, the present invention has equal application to QPSK signals.

The line signal 10 is inputted to demodulator 11. The output of the demodulator 11 is passed through equalizer 12 whose output is coupled to phase shifter 13. The output of phase shifter 13 is inputted into the slicer 14 and the positive terminal of adder 16. The output of slicer 14 is inputted into the negative terminal of adder 16 and also into conjugator 15. The output of both conjugator 15 and adder 16 are inputted into multiplier 17 with the output of multiplier 17 coupled to the input of IMAG 18, which extracts the imaginary part of the complex product. The output from IMAG 18 is the estimation of phase error and is inputted into amplitude limiter 19. The output of limiter 19 is inputted into FIR filter 20. The FIR filter 20 has variable coefficients to adapt to the estimated phase error. The output of FIR filter 20 at node 30 is inputted into two separate multipliers 21 and 22. Also inputted into multiplier 21 is gain G1 31. Also inputted into multiplier 22 is gain G2 32. The output of multiplier 22 is inputted into adder 24. The output of adder 24 is coupled to adder 25 and in a feedback fashion to delay 23. The output of multiplier 21 is also coupled to the input of adder 25. The output of adder 25 is coupled to sin/cos table 27 and in a feedback fashion to delay 26. The output of sin/cos table 27 is inputted back into phase shifter 13.

In operation, the circuit of FIG. 4 receives the line signal 10 and the demodulator 11 converts it into a two dimensional complex valued symbol within imaginary and real components. The output of the demodulator is coupled to the equalizer which corrects the signal for intersymbol interference. The equalized and demodulated output of equalizer 12 is coupled to a phase shifter where a phase correction is implemented. The phase shifter 13 receives a phase error compensation signal 34 as input.

The output 36 of the phase shifter 13 is provided to the slicer (quantizer) 14. The slicer 14 estimates the most probable ideal constellation point from the received complex signal 36 and provides this ideal constellation point as output 38. The ideal signal 38 is substracted from the received signal 36 at adder 16 to generate an error signal 40.

The ideal output 38 of slicer 14 is provided to conjugate block 15. The conjugate block 15 determines the conjugate of the ideal signal 38 and provides this value to multiplier 17 along with the error signal 40. The output 42 of multiplier 17 is provided to IMAG block 18 and the imaginary portion is provided as output 44. Output 44 is an estimate of the phase error of the input signal. The phase error estimate 44 is amplitude limited at limiting block 19 and the output $e_o$ of limiting block 19 is provided to tapped delay line 20.

The phase error is determined by the PLL to be the difference between the input and the output of slicer 14 multiplied by the conjugate of the output of slicer 14. This result is the output of multiplier 17. The imaginary part of this result is the estimated phase error in the line signal. This estimated phase error is inputted into an amplitude limiter to prevent loop instability. After passing through limiter 19, the phase error $e_o$ is fed to a finite impulse response (FIR) filter 20 (implemented as a tapped delay line) which store a history of past phase errors $e_1$, $e_2$, $e_3$, $e_4$, $e_5$, $e_6$. Each tap is coupled to node 30 through its own weighting coefficient, $R_1$, $R_2$, $R_3$, $R_4$, $R_5$ and $R_6$. The FIR coefficients are adjusted to minimize the mean squared phase error by a gradient method. The FIR coefficients are updated each baud according to the following equation:

$$R_i^{(n)} = R_i^{(n-1)} + K e_o e_i$$

where $R_i^{(n)}$ is the updated $i^{th}$ coefficient $R_i^{(n-1)}$ is the previous value of $i^{th}$ coefficient and K is a positive constant.

Figure 5:
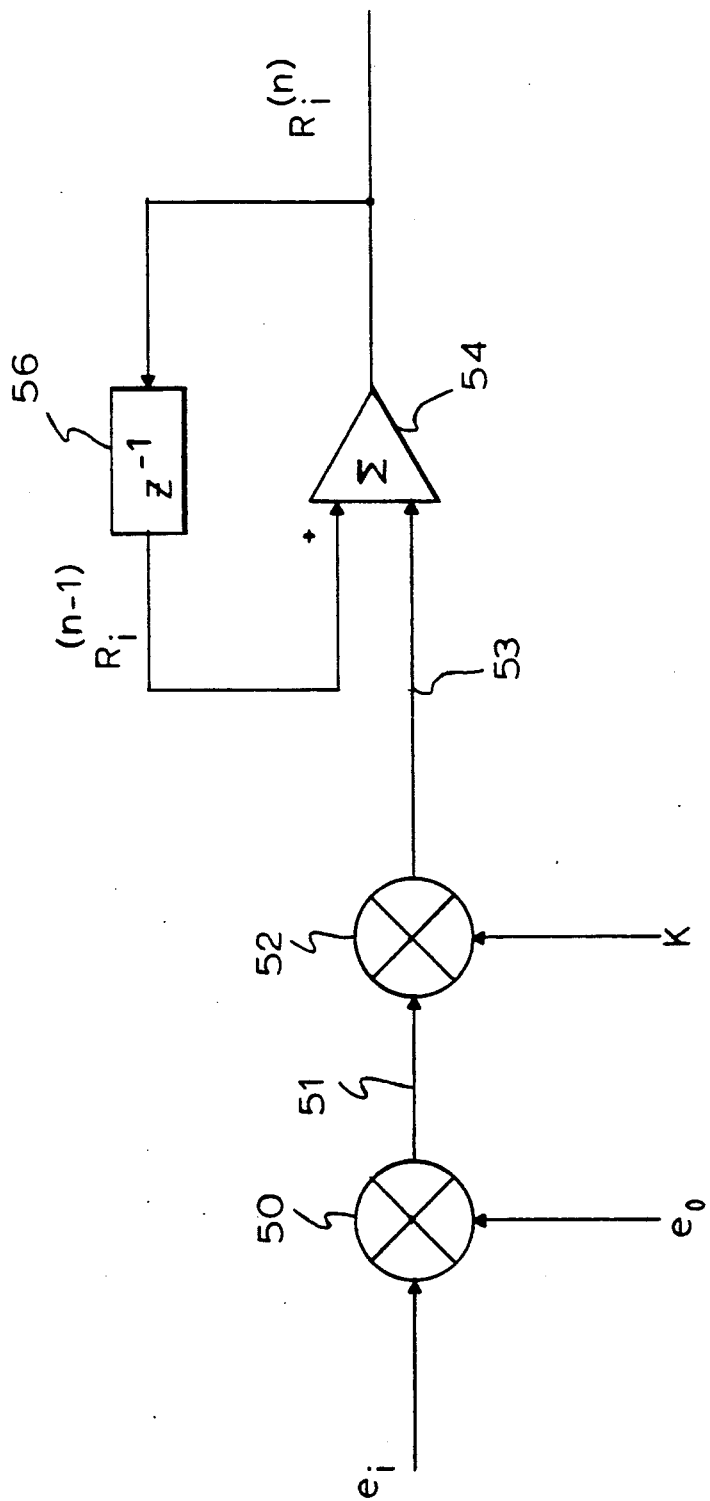
FIG. 5 is a block diagram illustrating the control block that updates FIR filter coefficients in the adaptive phase locked loop of the present invention.

FIG. 5 illustrates the updating process not shown in FIG. 4 for the FIR coefficients of filter 20 in the preferred embodiment of the present invention. In block diagram FIG. 5, input phase error $e_o$ and a stored past phase error $e_i$ are both inputted into multiplier 50. Output signal 51 from multiplier 50 is inputted into multiplier 52 along with constant K. Output signal 53 from multiplier 52 is inputted into adder 54. The output of adder 54 is coupled in feedback fashion to delay 56 with the feedback being the previous value of the ith coefficient $R_i^{(n-1)}$. Adder 54 adds signal 53 to the previous value of the ith coefficient resulting in the updated ith coefficient $R_i^{(n)}$. Thus, FIG. 5 shows a more detailed view of how filter 20 of FIG. 4 updates the FIR coefficients in the adaptive phase lock loop of the present invention.

Referring back to FIG. 4, the output of the FIR filter 20 provides an output signal that consists of a superposition (sum) of the input signal delayed and weighted. This sum is $\Sigma e_i R_i$ at node 30. This output signal needs to be amplified and so is multiplied at multipliers 21 and 22 by gains G1 31 and G2 32, respectively. Note that gain G1 31 can also be made adaptive according to the following formula:

$$G_1^{(n)} = G_1^{(n-1)} + K_1 e_0 \Sigma e_i R_i.$$

The output 46 of multiplier 21 is a phase correction signal and is provided as an input to adder 25.

The output of the FIR at node 30 is also coupled to a second order loop at multiplier 22. The output of the second order loop at node 35 is provided as one input of adder 25. The output 36 of multiplier 21 is also coupled to adder 25. The output at node 33 is coupled in a feedback loop through delay 26 to the input of adder 25. The output of the adder 25 at node 33 is the phase error signal.

The resulting phase error signal at node 33 from adder 25 is fed to sin/cos look-up table 27, providing outputs that are the sine and cosine of the phase error signal 33. The sin/cos table 27 feeds into the phase shifter 13 and provides an angle to the phase shifter 13. The output of equalizer 12 is multiplied by this angle to correct the input signal for phase jitter error.

The instantaneous error $e_0$ is the difference between the actual phase distortion present in the signal and the multiplier output 46 of FIG. 4, or the difference between the derivative of the phase distortion P and FIR filter output $G_1 e_i R_i$. Neglecting the second order loop which has a very small gain, $G_2$ 32, the equation for the instantaneous error $e_0$ is as follows:

$$e_0 = P - G_1 \Sigma e_i R_i$$

then, taking the square of $e_0$ $$e_0^2 = (P - G_1 \Sigma e_i R_i)^2$$

The error $e_0$ is squared in order to ensure a positive magnitude error. Although the actual derivative of the phase distortion P is initially unknown, the value of P can be predicted after several revolutions through the adaptive phase lock loop. Each revolution through the loop generates an $e_0$ and subsequently a new value for $G_1 \Sigma e_i R_i$. Thus, the value P can be predicted as the value $G_1 \Sigma e_i R_i$ eventually adjusts closer to value P since the error signal $e_0$ is incrementally reduced and is minimized. Thus, P can be predicted based on the past history values of error signals.

The gradient of $e_0^2$ is taken with respect to $R_i$ to drive the value $e_0^2$ to the minimum. By taking the derivative, the new value becomes:

$$\frac{\partial e_0^2}{\partial R_i} = -2 G_1 e_0 e_i$$

For fixed signal to noise ratio, $G_1$ is relatively constant. Since it is desired to have the variable coefficients adjusted at very small increments, the $-2G_1$ magnitude value is replaced by a much smaller constant. Therefore, $R_i$ is adjusted as:

$$R_i^{(n)} = R_i^{(n-1)} + K e_0 e_i$$

where K is a constant in the order of 0.001. The relatively constant value $G_1$ is replaced by much smaller constant K to maintain a slow rate of adjustment to prevent any divergence due to noise disturbance in the line signal. Thus, the variable coefficients are adjusted by adding onto the previous variable coefficient only a fraction of the gradient.

This same concept of maintaining a slow rate of convergence while avoiding any divergence is employed when updating the gain $G_1$. Also taking the partial derivative of the squared error signal with respect to $G_1$:

$$\frac{\partial e_0^2}{\partial G_i} = -2 e_0 \Sigma e_i R_i$$

By following the same rule as stated above:

$$G_1(n) = G_1^{(n-1)} + K_1 e_0 \Sigma e_i R_i$$

where $K_1$ is a constant on the order of 0.01. Thus, as the error $e_0$ becomes minimized, the last value of $G_1$ and $R_i$ will be the equivalent of their previous values.

This adaptive phase lock loop of the present invention can react to a wide range of frequencies and is not optimized for a specific frequency as is the case of prior art. Thus performance is not degraded if the present invention is employed in data modems transmitting at high speed.

Thus a novel method of tracking and removing jitter has been described.

I claim:

1. A circuit for detecting and eliminating frequency offset and phase jitter in an input signal comprising:
   receiving means for receiving said input signal and for generating an ideal signal;
   difference generating means coupled to said input signal and said ideal signal for generating a difference signal;
   first converting means receiving said ideal signal for generating a conjugate of said ideal signal;
   first phase error generating means coupled to said difference signal and said conjugate of said ideal signal for generating a first phase error signal;
   second converting means receiving said first phase error signal for generating an imaginary component of said first phase error signal;
   filter means coupled to said imaginary component of said first phase error signal, said filter means storing incoming said imaginary components of said first phase error signals, said filter means generating a second phase error signal based on a current imaginary component of said first phase error signal and previously stored imaginary components of previously generated phase error signals; and, phase correction means coupled to filter means and to said input signal, said phase correction means for generating an error correction signal based on said first error signal and for combining said error correction signal with said input signal.

2. The circuit of claim 1 wherein said receiving means comprises a quantizer.

3. The circuit of claim 1 further including limiting means coupled to said difference generating means and said filter means for limiting an amplitude of said phase error.

4. The circuit of claim 1 wherein said difference generating means comprises a subtracting means for receiving said input signal and said ideal signal and providing a first output signal, a multiplying means coupled to said subtracting means for multiplying said first output signal by a conjugate of said ideal signal for generating said phase error signal.

5. The circuit of claim 1 further including first scaling means coupled to said filter means for multiplying said first error signal by a first scaling factor.

6. The circuit of claim 5 further including second scaling means coupled to said filter means for multiplying said first error signal by a second scaling factor to generate a second output signal.

7. The circuit of claim 6 further including a second order loop coupled to said second output signal, said second order loop for compensating for frequency offset of said input signal.

8. The circuit of claim 1 wherein said filter means comprises a tapped delay line.

9. The circuit of claim 8 wherein said tapped delay line has a number of coefficients $R_1$, $R_2$, $R_3$, $R_4$, $R_5$ and $R_6$, etc., that are updated on each occurence of said input signal.

10. The circuit of claim 9 wherein said coefficients are updated according to:

$$R_i^{(n)} = R_i^{(n-1)} + K e_o e_i$$

where $R_i^{(n)}$ is the updated $i^{th}$ coefficient;
$R_i^{(n-1)}$ is the previous value of $i^{th}$ coefficient; and,
K is a constant;
$e_o$ is the incoming imaginary component of said first phase error signal;
$e_i$ is the ith past imaginary component of said first phase error signal.

11. The circuit of claim 10 wherein said first scaling means also implements variable coefficients to obtain an adjusted scaling value according to the following formula:

$$G_1^{(n)} = G_1^{(n-1)} + K_1 e_o \Sigma e_i R_i,$$

where $G_1^{(n)}$ is the updated ith first scaling means;
$G_1^{(n-1)}$ is the previous value of the first scaling means;
$K_1$ is a constant.

12. A feedback loop circuit for detecting and eliminating phase jitter and frequency offset in an input signal comprising:

quantizing means receiving said input signal and generating a first output signal, said first output signal being an estimate of unjittered input signal;

first summing means coupled to said quantizing means and said input signal and generating a second output signal for determining phase difference between said line signal and said first output signal;

first converting means coupled to said quantizing means for generating conjugate of said first output signal, and first converting means for providing a third output signal;

integrating means receiving said second and third output signals for integration, said integrating means providing a fourth output signal;

second converting means coupled to said fourth output signal for determining an imaginary component of said fourth output signal, said second converting means providing a fifth output signal;

amplitude limiting means coupled to said fifth output signal for preventing loop instability, said amplitude limiting means providing a sixth output signal;

filtering means having variable coefficients coupled to said sixth output signal for minimizing phase error in said sixth output signal, said filtering means providing a seventh output signal;

first scaling means coupled to said seventh output signal for multiplying said seventh output signal by a predetermined first scaling factor, said first scaling means for providing an eighth output signal;

second scaling means coupled to said seventh output signal for multiplying said seventh output signal by a predetermined second scaling factor, said second scaling means for providing a ninth output signal;

a second order loop coupled to said ninth output signal for correcting frequency offset existing in said ninth output signal, said second order loop providing a tenth output signal;

a second summing means coupled to said eighth and tenth output signals for summing said eighth and tenth output signals, said second summing means providing an eleventh output signal;

third converting means coupled to said eleventh output signal for determining kind of phase angle to be multiplied to said input signal for correction, said third converting means providing a twelfth output signal;

phase shifting means coupled to said input signal and said twelfth output signal to eliminate phase offset in said input signal, said phase shifting means providing a thirteenth output signal which is coupled to said quantizing means.

13. The circuit of claim 12 wherein said third converting means is a sine/cosine look-up table.

14. The circuit of claim 13 wherein said filtering means has a number of coefficients, $R_1$, $R_2$, $R_3$, $R_4$, $R_5$, and $R_6$, etc., that are continuously updated each baud by said sixth output signal.

15. The circuit of claim 14 wherein the output of said filtering means is equal to the sum of the products of each variable coefficient and its stored error signal.

16. The circuit of claim 15 wherein the variable coefficients of said filtering means are adjusted to minimize the mean squared error by gradient method.

17. The circuit of claim 16 wherein said first scaling means also implements variable coefficients to obtain an adjusted scaling value according to the following formula:

$$G_1^{(n)} = G_1^{(n-1)} + K_1 e_o \Sigma e_i R_i,$$

where $G_1^{(n)}$ is the updated ith first scaling means;
$G_1^{(n-1)}$ is the previous value of the first scaling means;
$K_1$ is a constant;
$e_o$ is the incoming phase error;
$e_i$ is the ith past phase error.

* * * * *